United States Patent [19]
Butz et al.

[11] Patent Number: 5,599,054
[45] Date of Patent: Feb. 4, 1997

[54] VEHICULAR STORAGE APPARATUS FOR ELONGATED OBJECTS

[75] Inventors: Peter Butz, Langenfeld; Wolfgang Sitzler, Wuppertal, both of Germany

[73] Assignee: Buth Fahrzeugteile GmbH, Ebeleben, Germany

[21] Appl. No.: 549,627

[22] Filed: Oct. 27, 1995

[30]   Foreign Application Priority Data

Nov. 3, 1994 [DE] Germany .......................... 44 38 909.4

[51] Int. Cl.⁶ ...................................................... B60R 7/06
[52] U.S. Cl. ...................................... 296/37.8; 296/37.14
[58] Field of Search ............................... 296/37.8, 37.14, 296/37.15, 37.16

[56]          References Cited

U.S. PATENT DOCUMENTS 4,807,920  2/1989  Fujiki et al. ........................... 296/37.8

FOREIGN PATENT DOCUMENTS 2278537  2/1976  France .................................. 296/37.8
3738931  6/1989  Germany .
3901354  7/1990  Germany .
9417440  2/1995  Germany .

*Primary Examiner*—Joseph D. Pape
*Attorney, Agent, or Firm*—Herbert Dubno; Andrew Wilford

[57]            ABSTRACT

An apparatus for storing and transporting elongated objects in a motor vehicle has a box having a floor and a plurality of sides together defining a chamber. The box is adapted to be secured with the floor horizontal in a motor vehicle. An open annular frame hinged on one of the sides is displaceable between a down position lying on the box and an up position standing transversely up from the box. A sleeve-like bag or container has a closed end and an opposite open end secured to the frame. The container is collapsible into a compacted condition and fittable in a stowed position when in the compacted condition in the chamber. A cover fits over the box to close the chamber and contain the frame when in the down position of the frame and the stowed position of the container. The cover is mounted on the box by an attachment allowing the cover to move on the box independently from and relative to the frame.

14 Claims, 4 Drawing Sheets

VEHICULAR STORAGE APPARATUS FOR ELONGATED OBJECTS

FIELD OF THE INVENTION

The present invention relates to an apparatus for storing and transporting elongated objects in a motor vehicle. More particularly this invention concerns a bag-like apparatus for containing skis, fishing poles, and the like while transporting them in a van or other motor vehicle.

BACKGROUND OF THE INVENTION

Transporting elongated objects like skis or fishing poles in a car or van presents a particular problem even when there is room in the vehicle, typically between bucket seats, for the objects. Not only are these objects frequently wet and/or dirty, but they represent a considerable encumbrance to the passengers of the vehicle. In an accident they can fly about in the vehicle and present a considerable safety hazard.

Thus German patent 3,738,931 of W. Trutter describes a apparatus where a central section of the back seat is provided with a storage apparatus comprised of a basically upright annular frame to which is attached the open end of an elongated bag. The bag is normally folded up in a wad and fits in a box-like container behind a normally closed cover. For use, the cover is flopped down forward and the container is removed from the back so that the bag can be extended forward, normally right between the front seats. Then the skis or the like can be inserted into the bag from the rear via the trunk or hatch back so that they are fairly well contained in the bag. The vehicle passengers are thus protected against direct contact with the skis and the skis are contained so that in a violent maneuver or accident they will stay in place. Such a apparatus is virtually impossible, however, to retrofit to a vehicle or move from one vehicle to another.

Another such apparatus is described in German patent 3,901,354 of E. Butz. It comprises an annular frame that is stored in a horizontal position under the rear-window deck between the back vehicle seats, and that can be pivoted down into a vertical position. A bag has its mouth attached to the frame so that when it is vertical the bag can be pulled out and skis or the like can be inserted from the trunk into the bag as described above. This apparatus is also vehicle-specific and does not readily lend itself to installation as a retrofit.

OBJECTS OF THE INVENTION

It is therefore an object of the present invention to provide an improved apparatus for storing and transporting elongated objects in a motor vehicle.

Another object is the provision of such an improved apparatus for storing and transporting elongated objects in a motor vehicle which overcomes the above-given disadvantages, that is which can readily be retrofitted to a wide range of vehicles, and that even can be moved from vehicle to vehicle.

SUMMARY OF THE INVENTION

An apparatus for storing and transporting elongated objects in a motor vehicle has according to the invention a box having a floor and a plurality of sides together defining a chamber. The box is adapted to be secured with the floor horizontal in a motor vehicle. An open annular frame hinged on one of the sides is displaceable between a down position lying on the box and an up position standing transversely up from the box. A sleeve-like bag or container has a closed end and an opposite open end secured to the frame. The container is collapsible into a compacted condition and fittable in a stowed position when in the compacted condition in the chamber. A cover fits over the box to close the chamber and contain the frame when in the down position of the frame and the stowed position of the container. The cover is mounted on the box by an attachment allowing the cover to move on the box independently from and relative to the frame.

Thus the box forms a chamber capable of holding the collapsed container bag. The frame holds the end of the container open so skis, fishing poles, or the like can be slipped into it from the rear for safe storage and transport. Thus this arrangement can readily be retrofitted to many different types of vehicles. It can in particular be set in the well of the rear luggage compartment of a utility vehicle, positioned so the bag when it is extended forward projects between the seats and so that when closed the cover is flush with the vehicle floor. It can even be releasably mounted so it can be moved from vehicle to vehicle, or it can be built into a retrofit armrest between two front or rear seats.

According to the invention the cover is separable from the box and is attached to it by a pair of pins projecting from the cover and a pair of seats for the pins on the one side of the box. The container has a closed front end fixed to the cover. In addition it is possible to secure the cover in the vehicle forward of and at a spacing from the box with the container stretched between the cover and the frame. This is done by providing the vehicle forward of the box with a pair of seats for the pins.

Normally according to the invention a link is provided for releasably retaining the frame in the up position. The link includes a pair of link arms secured between the frame and respective sides of the box.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
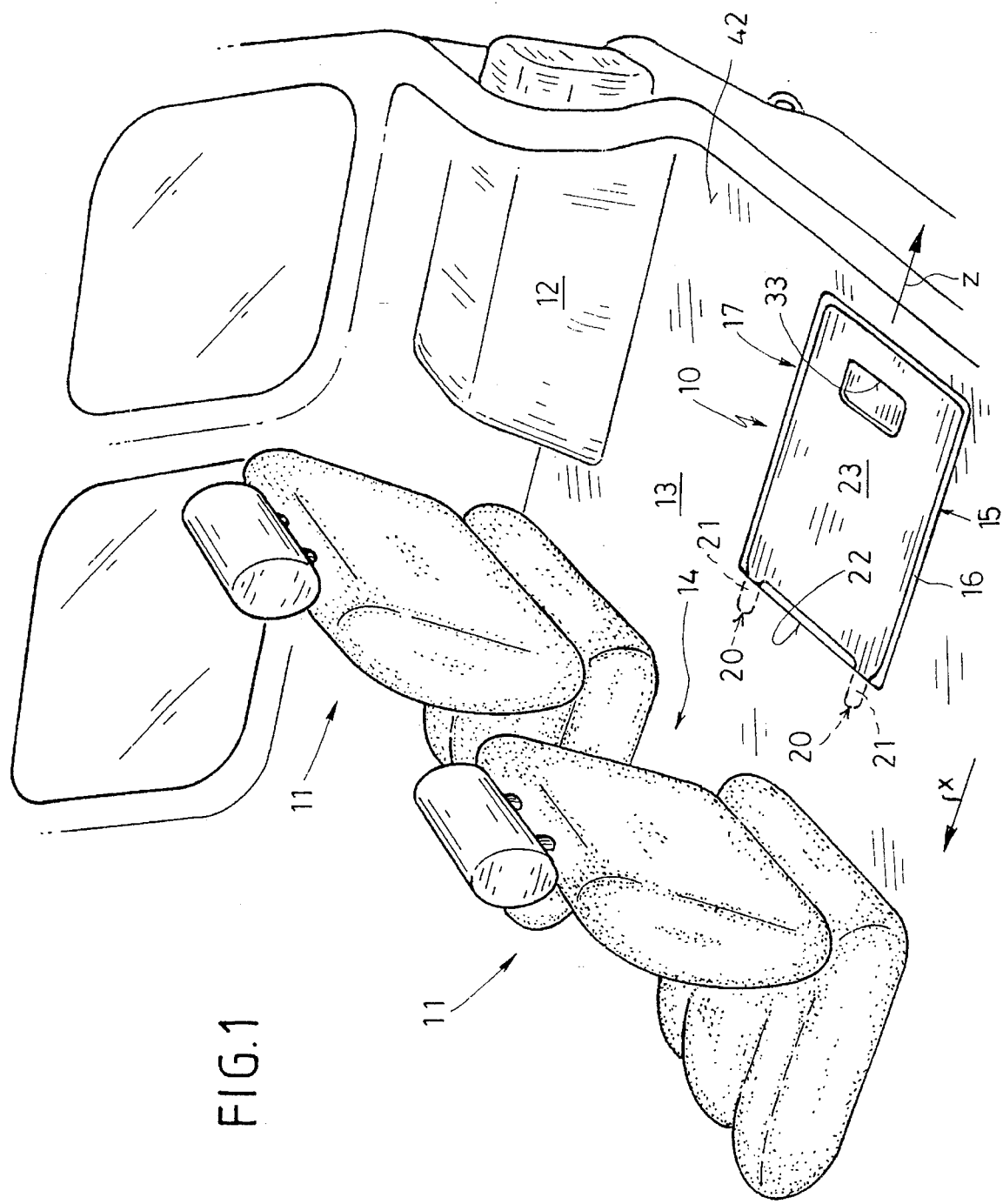
FIG. 1 is a cut-away view of a vehicle interior equipped with the apparatus of this invention in the stowed position.
Figure 2:
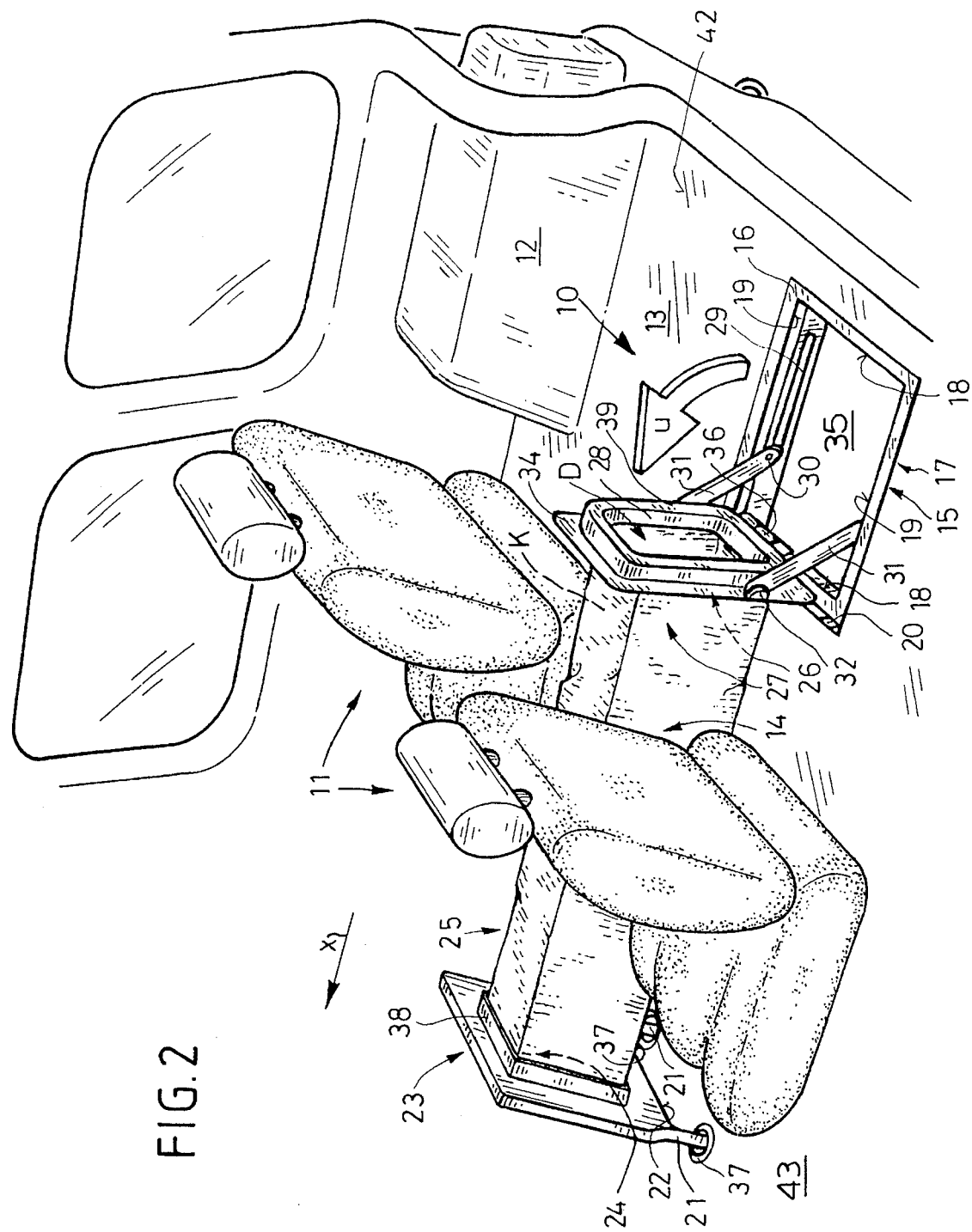
FIG. 2 is a view like FIG. 2 but with the apparatus in the deployed position.

As seen in FIGS. 1 and 2 a motor vehicle has a pair of seats 11 separated by a gap 14 and having a rear storage area 13 between a pair of rear-wheel wells 12 and provided with a flat and normally horizontal floor 42. A well 15 cut in this floor receives a storage apparatus 10 basically comprising a frame 16, a box 17, a cover 23, a bag 25, and a frame 27.

The frame 16 is of L-section and rectangular and fits in the well 15 in the top of the box 17. It has relative to a normal vehicle travel direction x two short front and rear edges 18 and two long side edges 19. The box 17 is secured to the frame 16 and defines a planar floor 35 that is spaced below and parallel to the luggage-compartment floor 42. The front end edge 18 of the frame 16 is formed with a pair of seats or holes 20 through which engage pins or feet 21 projecting from a front short side 22 of the cover 23.

This cover 23 is basically flat and rectangular and is formed with a hand-hold well 33. The bag 25 has a closed front end 24 secured to the inside of a rearwardly projecting rectangular rim 38 on the back face of the cover 23 and an open rear end 26 secured to the frame 27. This bag 25 is made of a heavy, waterproof, and flexible fabric. Thus the cover 23 reinforces the front end 24 of the bag 25, preventing anything sharp from poking through it.

The frame 27 has a flange 34 that lies atop the frame 16 in the FIG. 1 stowed or closed position of the apparatus 10 and a rearwardly projecting rectangularly annular rim 28 having a rear edge 39 that normally sits on the floor 35 of the box 17. In the closed position the cover 23 and its rim 28 define with the floor 35 a chamber that is sufficiently large to contain the bag 25 in folded-up condition.

The long sides 19 of the floor frame 16 are formed with front-to back guide slots 29 in which run rear-end pivots 30 of link bars 31 whose front ends 32 are pivoted on the rim 28 of the frame 27. In addition the front edge of the flange 34 of this frame 27 is secured by a hinge 36 to the short front edge 18 of the frame 16.

Assuming the apparatus 10 is in the closed position of FIG. 1, it is used by gripping the handle 33 and pulling the cover back in direction z opposite to direction x to pull the feet 21 out of the holes 21. The cover 23 is then pulled forward through the gap 14 between the seats 11 and the feet 21 are fitted to holes or seats 37 in the vehicle floor 43 forward of the seats 11. This action inherently pivots up the frame 27 as indicated by arrow 7 and pulls the bag 25 tight between the essentially vertical cover 23 and frame 27, forming a passage D into which elongated objects such as skis can be fitted.

When the apparatus 10 is no longer needed the pin feet 21 are pulled out of the seats 37 and the cover 23 is brought back through the gap 14 between the seats 11. The rear ends 30 of the links 31, which are normally seated in unillustrated notches in the guides 29 to maintain the erect position of the frame 27, are unseated and the frame 27 is pivoted back into the frame 16. The bag 25 is then folded and tucked into the upwardly open compartment formed by the rim 28 and the floor 35, and the feet 21 are fitted into the holes 20, whereupon the cover 23 is pivoted back down against the direction U and the apparatus 10 is closed up and out of the way.

This apparatus 10 can easily be retrofitted to most large vehicles and vans having separated seats 11. All the user need do is cut a rectangular hole in the vehicle floor to form the well 5, and form two holes and fit them with liners to form the seats 37. When not in use the apparatus 10 takes up no useful space. Alternately it can be constituted like a small suitcase that is releasably secured to the vehicle floor when needed.

Figure 3:
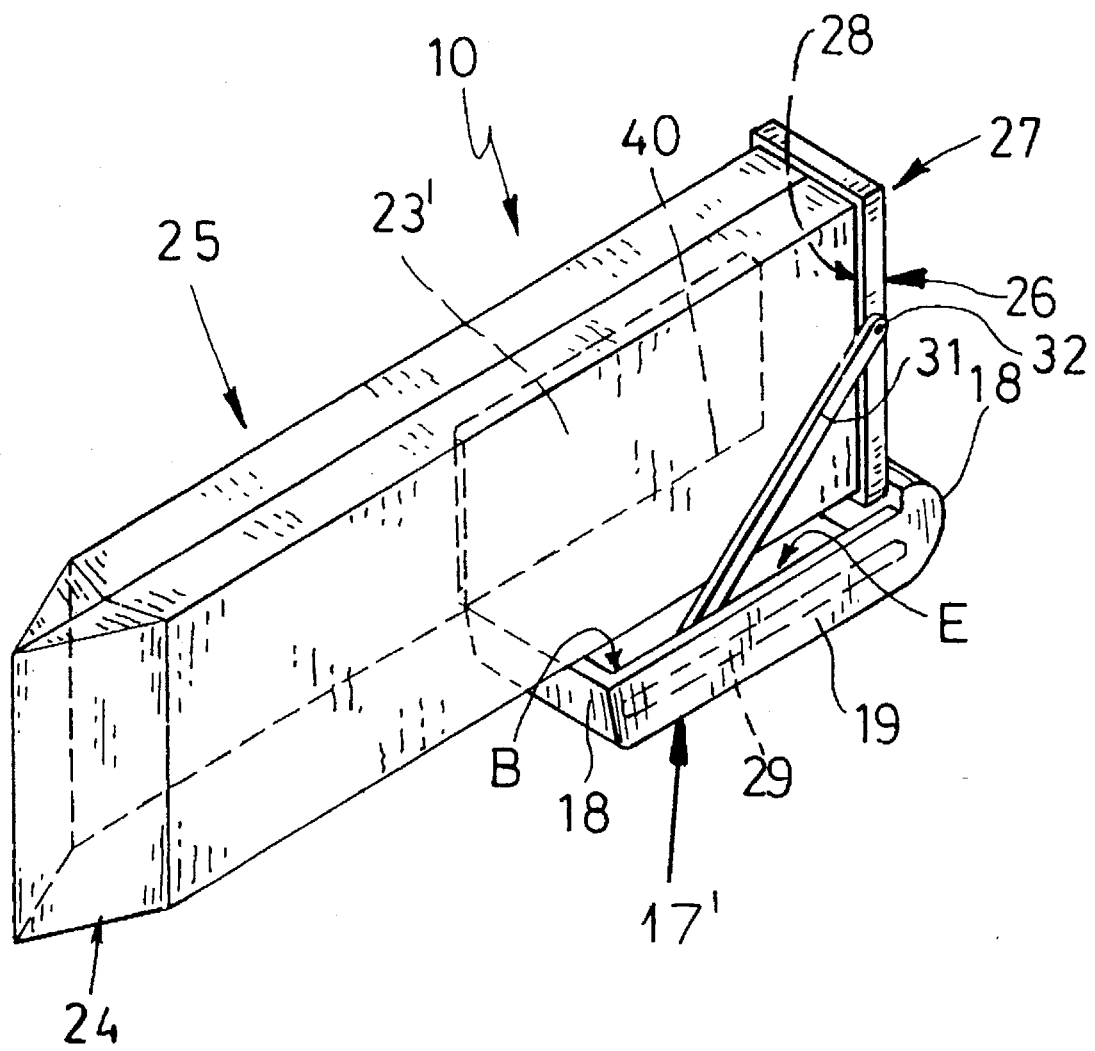
FIGS. 3 and 4 are perspective views of two further apparatuses according to the invention.

In the arrangement of FIG. 3 the box 17' is a separate item that is set or secured on the vehicle floor. Here the lid 23' is secured along one of its long front-to-back edges via a hinge 40 to one of the long edges 19 of the box 17'. The front end 24 of the bag 25 is not connected to the cover 23', but is simply closed. The frame 27 here does not contain the full compacted volume of the folded bag 25, although this is easily held in the box 17' when the frame 27 is down. The box 17 can be constructed like a small suitcase with a handle on one side so it can be moved from vehicle to vehicle.

Figure 4:
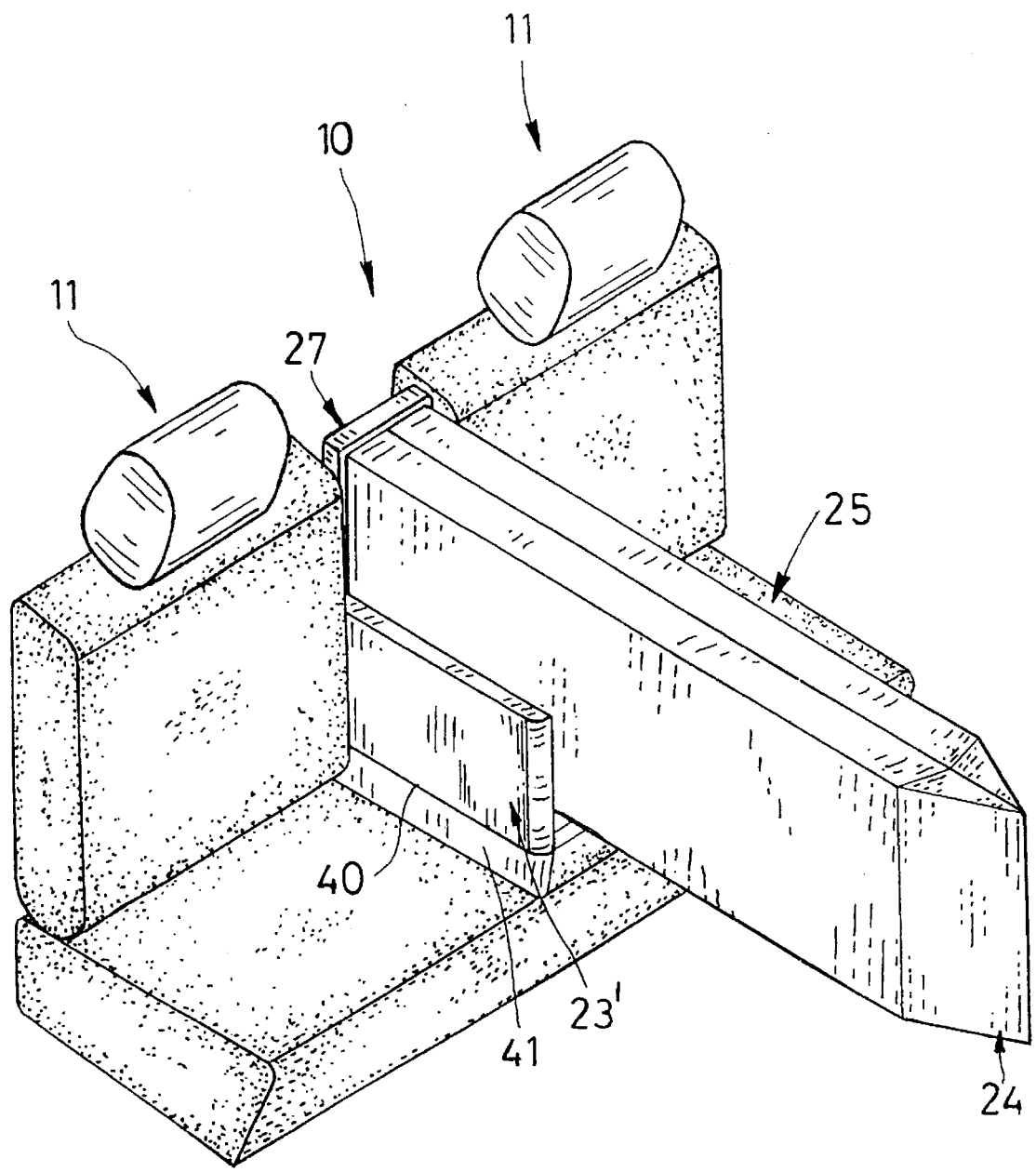

In FIG. 4 the apparatus is built into an arm rest 41 between the seats 11. The cover 23' which is hinged at 40 as in FIG. 3, is padded to constitute the arm-rest surface.

We claim:

1. An apparatus for storing and transporting elongated objects in a motor vehicle, the apparatus comprising:
   a box having a floor and a plurality of sides together defining a chamber, the box being adapted to be secured with the floor horizontal in a motor vehicle;
   an open annular frame hinged on one of the sides and displaceable between a down position lying in the box and an up position standing transversely up from the box;
   a sleeve-like container having a closed end and an opposite open end secured to the frame, the container being collapsible into a compacted condition and fittable in a stowed position when in the compacted condition in the chamber;
   a cover fittable over the box to close the chamber and contain the frame when in the down position of the frame and the stowed position of the container;
   attachment means mounting the cover on the box for movement independent from and relative to the frame.

2. The storing/transporting apparatus defined in claim 1 wherein the cover is separable from the box.

3. The storing/transporting apparatus defined in claim 1 wherein the attachment means is a hinge.

4. The storing/transporting apparatus defined in claim 1 wherein the attachment means is a pair of pins projecting from the cover and a pair of seats for the pins on the one side of the box.

5. The storing/transporting apparatus defined in claim 1 wherein the cover is separable from the box and the container has a closed front end fixed to the cover.

6. The storing/transporting apparatus defined in claim 5, further comprising
   means for securing the cover in the vehicle forward of and at a spacing from the box with the container stretched between the cover and the frame.

7. The storing/transporting apparatus defined in claim 6 wherein the attachment means is a pair of pins projecting from the cover and a pair of seats for the pins on the one side of the box and the securing means includes a further pair of seats forward of the box in the vehicle.

8. The storing/transporting apparatus defined in claim 1 wherein the vehicle has a floor in which the box is set with the cover in the closed position flush with the vehicle floor.

9. The storing/transporting apparatus defined in claim 1 wherein the box forms an arm rest of the vehicle.

10. The storing/transporting apparatus defined in claim 9 wherein the frame is pivoted along a back side of the box and the cover along a lateral side of the box extending perpendicular to the back side.

11. The storing/transporting apparatus defined in claim 1 further comprising link means for releasably retaining the frame in the up position.

12. The storing/transporting apparatus defined in claim 11 wherein the link means includes a pair of link arms secured between the frame and respective sides of the box.

13. The storing/transporting apparatus defined in claim 1 wherein the container is an elongated bag.

14. The storing/transporting apparatus defined in claim 13 wherein the bag has an open rear end secured around an opening defined by the frame.

* * * * *